(12) United States Patent
Waters et al.

(10) Patent No.: US 6,535,132 B2
(45) Date of Patent: Mar. 18, 2003

(54) TARGETED INFORMATION DISPLAY

(75) Inventors: John Deryk Waters, Bath (GB);
Lawrence Wilcock, Malmesbury (GB);
James Thomas Edward McDonnell,
Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/859,816

(22) Filed: May 18, 2001

(65) Prior Publication Data

US 2002/0008626 A1 Jan. 24, 2002

(30) Foreign Application Priority Data

May 20, 2000 (GB) .............................................. 0012132

(51) Int. Cl.⁷ .............................................. G08B 23/00
(52) U.S. Cl. .............. 340/573.1; 340/5.91; 340/825.55; 235/692; 235/383; 345/902
(58) Field of Search ................................ 340/573.1, 5.8, 340/5.81, 5.86, 825.55, 5.91; 235/492, 383; 345/902

(56) References Cited

U.S. PATENT DOCUMENTS

| 5,420,606 A | * | 5/1995 | Begum et al. ............... 345/156 |
| 5,740,549 A | * | 4/1998 | Reilly et al. ................... 705/14 |
| 6,091,956 A | * | 7/2000 | Hollenberg ................. 455/456 |
| 6,115,611 A |   | 9/2000 | Kimoto et al. ............. 455/456 |
| 6,119,935 A | * | 9/2000 | Jelen et al. .................. 235/383 |
| 6,123,259 A | * | 9/2000 | Ogasawara .................. 235/380 |
| 6,283,377 B1 | * | 9/2001 | Takuma ....................... 235/492 |

FOREIGN PATENT DOCUMENTS

| EP | 0848564 A2 | 6/1998 | | |
| EP | A-971303 | 12/2000 | | |
| EP | 0971303 A2 | * 12/2000 | ........... | G06F/17/60 |
| GB | 0971303 A2 | * 2/2000 | | |
| JP | 10-13961 | 1/1998 | | |

OTHER PUBLICATIONS

Beadle, H.W.P., Harper, BB., Maquire Jr., G.Q. and Judge, J., "Location Aware Mobile Computing," *Proc. IEEE/IEE Internat'l Conference on Telecommunications (ICT'97)*, Melbourne (Apr. 1997).

* cited by examiner

*Primary Examiner*—Daniel J. Wu
*Assistant Examiner*—Son Tang

(57) ABSTRACT

The proximity of potential customers to a shop is detected, for example, by detecting short-range communication devices carried by passers-by. The interests of the detected passers-by are then determined by reference to specific interests transmitted by the passer-by devices and/or by reference to customer profile data. The discovered interests of the current passers-by are then used to select content for display on a shop-window electronic display during a next display slot. Passers-by who may be particularly interested in the displayed content are preferably sent an alert. In other embodiments, the targeted audience is a static group, such as train passengers, with the targeted information being displayed at a station.

30 Claims, 2 Drawing Sheets

TARGETED INFORMATION DISPLAY

CROSS-REFERENCE TO RELATED APPLICATIONS

This application is related to co-pending U.S. patent application Ser. No. 09/859,817, filed concurrently herewith.

FIELD OF THE INVENTION

The present invention relates to a method and system for targeted information display and in particular, but not exclusively, to the targeted display of information to passers-by, for example, in a shopping mall.

BACKGROUND OF THE INVENTION

Mobile devices with communications capability are becoming ubiquitous, the most common being the cell phone and other devices employing cellular radio technology. Many services are being implemented using such devices and many more may be expected as information regarding the location or position of the mobile device becomes readily available through the implementation of location discovery within the mobile radio infrastructure.

One type of service that is emerging is the distribution of local information which is relevant only to a particular narrow geographic location and need only be communicated to people within that location. Such information is usually distributed as a result of a request generated from a mobile device, the request either including the device's location or authorizing the obtaining of the device's location from a location server of the mobile radio infrastructure. The locally-relevant information can also be pushed over the mobile radio infrastructure to mobile devices within a given locality, though the costs of doing so are high. The type of information which it is most desirable to be able to push is information with a certain immediacy to it either because the information will go out of date quickly or because the target audience is transitory. One example is where a theatre still has seats available for a show shortly starting, and would like to offer the seats at half price. Another example is information about consumer goods (particularly new products or products under special promotion) which a shop wishes to advertise to consumers passing by.

In view of the cost and complexity of using cellular mobile radio networks to push information, it would be useful to have a different way of distributing local information which has immediacy to it.

A number of technologies exist for the short range communication of information between mobile devices. These technologies include infra-red based technologies and low-power radio technologies (including, in particular, the recent "Bluetooth" short range wireless standard). Depending on the technology implementation, differing types of message propagation will be enabled including asynchronous message broadcast, and multicast and point-to-point duplex connections established after coordination and negotiation between communicating devices.

Such short-range communication systems can be used to communicate information between commercial premises and passers-by provided, of course, the passers-by are equipped with suitable receiving devices. A further restriction on the usefulness of short-range communication devices for sending commercial information to passers-by is that passers-by will generally ignore such information unless they have some expectation that it will be of interest to them; even with this expectation, however, passers-by may well not be bothered to get out their communication device to check whether an incoming message is of interest.

It is known to display on an HTML display terminal a user's display page when the user approaches the terminal—see the paper "Location Aware Mobile Computing", H. W. Peter Beadle, B. Harper, G. Q. Maguire, J. Judge; Proc. IEEE/IEE International Conference on Telecommunications, (ICT'97), Melbourne, April, 1997. It is also known to push promotions concerning particular shops to the mobile devices of users who are detected as being near the shops and have a profile indicating that they are likely to be interested.

It is an object of the present invention to provide a method and system for presenting information to passers-by that overcomes at least some of the foregoing difficulties.

SUMMARY OF THE INVENTION

According to one aspect of the invention, a method of targeted content display, comprises the steps of:

(a) detecting the presence of persons passing through a presence zone on the basis of transmissions made from mobile communication devices carried by such persons;

(b) using information in said transmissions to ascertain interest indicators associated with the detected persons;

(c) selecting content for display having regard to interest indicators found in step (b); and (d) displaying the selected content on a display.

Steps (a) to (d) are carried out on an on-going basis with the displayed content being updated from time to time. The selection of content for display at each update is based on the interest indicators of the most recently detected persons without restriction to there only being a single such person. When multiple persons have been recently detected, content selection is based on the interest indicators of more than one person.

Another aspect of the invention relates to a display system having a detection arrangement for detecting the presence of persons passing through a presence zone on the basis of transmissions made from mobile communication devices carried by such persons. An interest-determination sub-system uses information in the transmissions to ascertain interest indicators associated with the detected persons. A content selector selects content for display; the selected content is with regard to the interest indicators obtained by the interest-determination sub-system. An output arrangement has a display for displaying the content selected by the content selector. The display is separate from the mobile communication devices. The display is arranged to operate on an on-going basis with the displayed content being updated from time to time. The content selector selects content for display at each update in dependence on the interest indicators obtained by the interest-determination sub-system for the most recently detected persons without restriction to there only being a single such person. When multiple persons have been recently detected, content selection is based on the interest indicators of more than one person.

A further aspect of the invention relates to a method of targeted stimulation by detecting the presence of creatures passing through a presence zone on the basis of transmissions made from mobile communication devices, carried by such creatures. Information in the transmissions is used to ascertain interest indicators associated with the detected creatures. Content having regard to the ascertained interest indicators is selected. The selected content is supplied to a sensory stimulator separate from the mobile communication devices. The foregoing steps are carried out on an on-going basis with the content being updated from time to time. The selection of content for stimulation at each update is based on the interest indicators of the most recently detected creatures without restriction to there only being a single such creature. When multiple creatures have been recently detected, content selection is based on the interest indicators of more than one creature.

Another aspect of the invention relates to a system having a detection arrangement for detecting the presence of creatures passing through a presence zone on the basis of transmissions made from mobile communication devices carried by such creatures. An interest-determination sub-system uses information in the transmissions to ascertain interest indicators associated with the detected creatures. A content selector selects content for stimulation of the creatures having regard to the interest indicators obtained by the interest-determination sub-system. An output arrangement has a stimulator for stimulating the content selected by the content selector. The stimulator is separate from the mobile communication devices. The system is arranged to operate on an on-going basis with the stimulated content being updated from time to time. The content selector is operative to select content to be supplied to the stimulator at each update in dependence on the interest indicators obtained by the interest-determination sub-system for the most recently detected creatures without restriction to there only being a single such creature. When multiple creatures have been recently detected, content selection is based on the interest indicators of more than one creature.

BRIEF DESCRIPTION OF THE DRAWINGS

A method and system, both embodying the present invention, for the display of information to passers-by, will now be described, by way of non-limiting example, with reference to the accompanying diagrammatic drawings, in which:

FIG. 1 is a diagram illustrating the use by a shop of a short-range communications transceiver for communication with passers-by.

DETAILED DESCRIPTION OF PREFERRED EMBODIMENT

Figure 1:
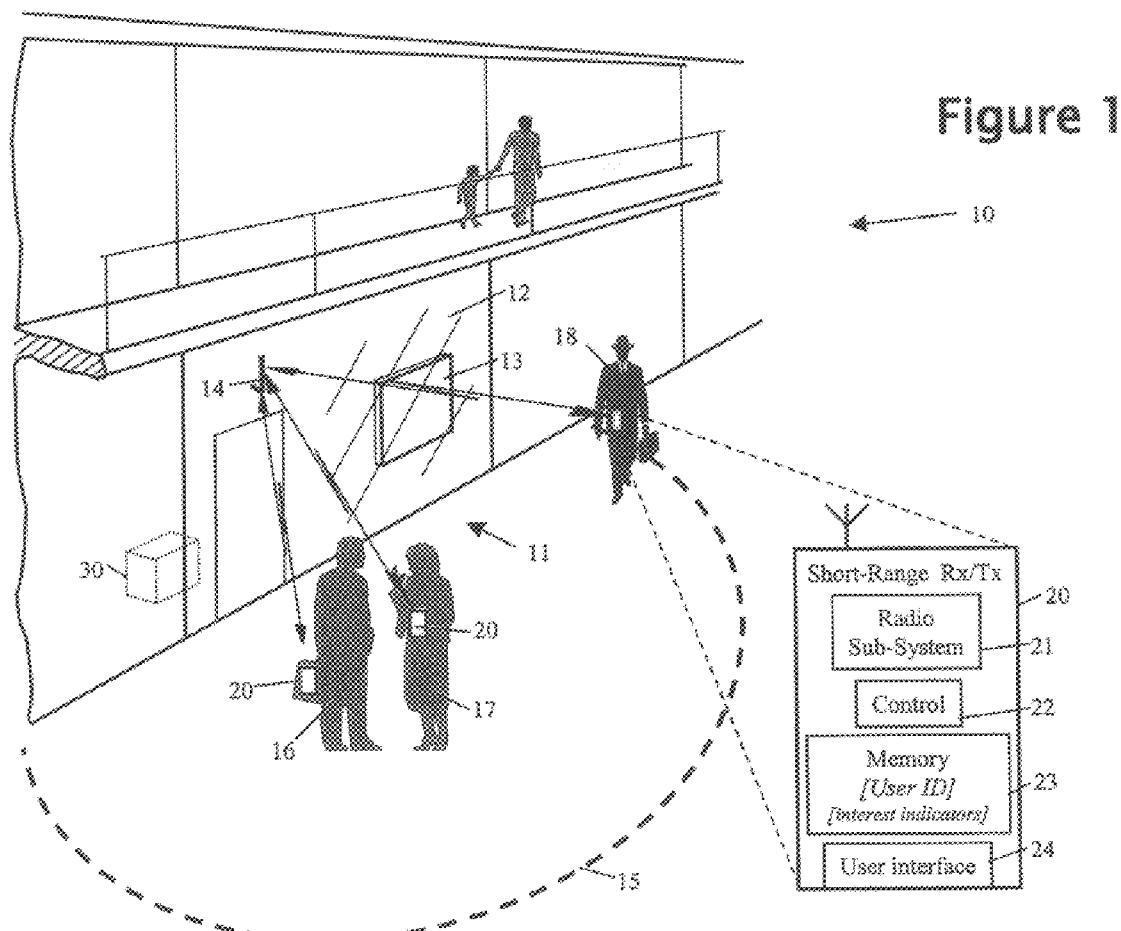

FIG. 1 depicts part of a shopping mall 10 and, in particular, a shop 11 with a display window 12 through which passers-by 16, 17, 18 can see an electronic display 13 (for example, a video monitor or LED display). The display 13 is used for displaying promotional and other information (generally referred to below as "content").

The shop 11 is equipped with a short-range wireless transceiver 14 for communicating with corresponding mobile devices 20 carried by passers-by when the latter are in a coverage zone 15 (also called below, the "presence zone"). The actual form of the short-range communications technology employed is not critical to the present invention and any suitable technology can be used (for example, infra-red or Bluetooth radio system) together with any appropriate propagation regime (broadcast, multicast, repeated one-to-one, etc). In the present embodiment, a radio-based technology is depicted.

FIG. 1 shows certain details of one of the mobile devices 20. In particular, the device includes, in addition to the radio subsystem 21, a control block 22, a memory 23, and a user interface 24 through which the user can set in a user ID and interest indicators for storage in memory 23. The interest indicators may, for example, indicate that the user is interested in a general topic such as sports goods, or specific topics, such as buying a shirt of a particular color.

In general terms, the operation of the illustrated embodiment of the present invention is as follows. The shop transceiver 14 emits a beacon signal at frequent intervals. The devices 20 of passers-by 16-18 in the presence zone 15 pick up this signal and each responds with a message containing the user ID and interest indicators stored in the device memory 23. The messages received at transceiver 14 are supplied to the shop's data processing system 30 which uses the user IDs to ascertain if any of the passers-by is a customer and, if so, looks up the customer's profile in a database to ascertain the customers interests. This interest information, together with that provided in the received messages, is then used to determine what content to display on the shop-window display 13 during a next display time slot—generally the objective would be to display content that is likely to be of the most interest to the current set of passers by taken as a whole (other objectives are also possible, as will be described below). An alert may also be sent back to those of the passers-by to whom the displayed content is particularly relevant.

Figure 2:
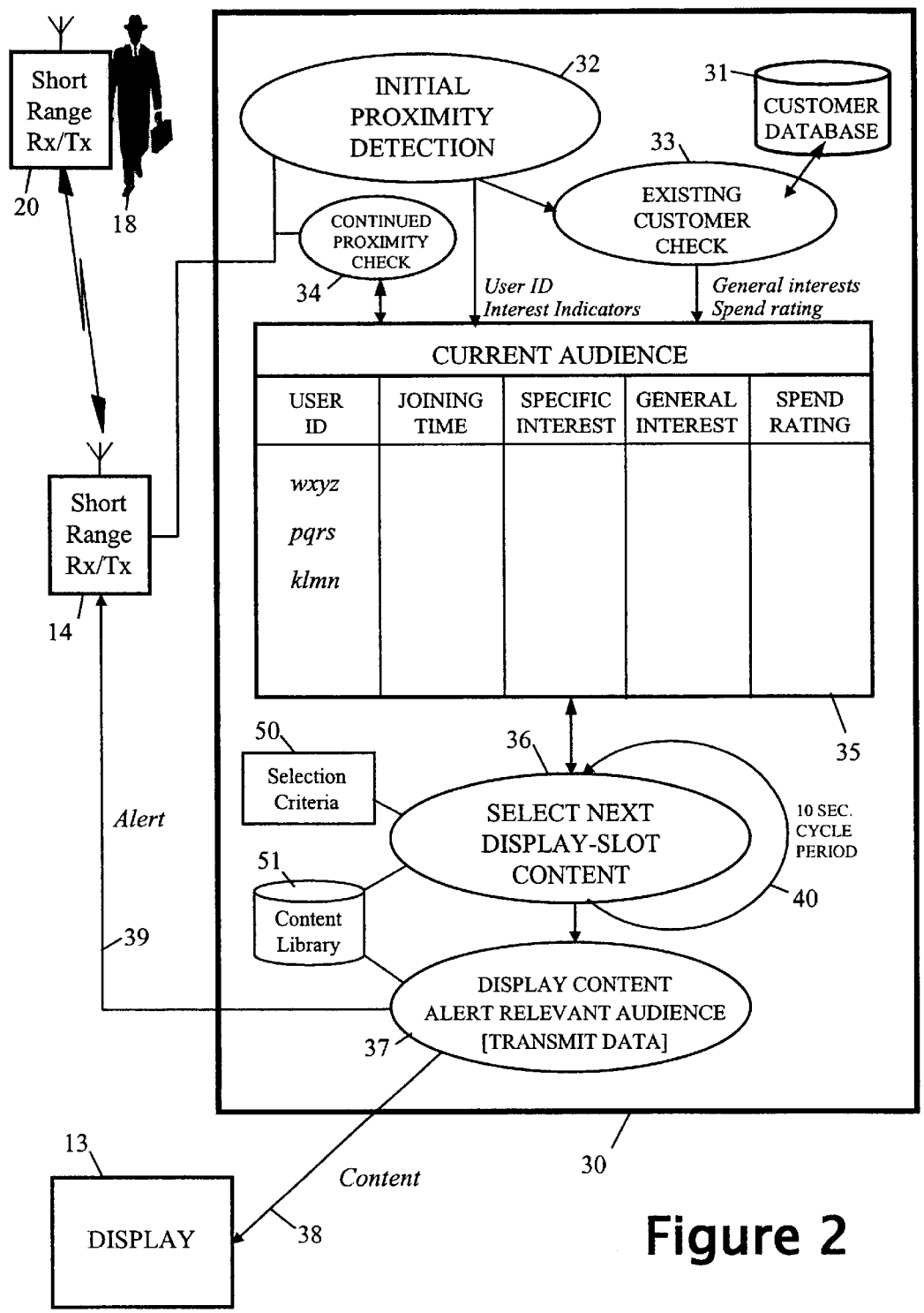
FIG. 2 is a diagram of the system embodying the invention used by the FIG. 1 shop to present passers-by with information of potential interest through a shop window display.

A more detailed description of the operation of the data-processing system 30 will now be given with respect to FIG. 2.

The data processing system 30 receives input from the short-range-transceiver 14 and provides output to the transceiver 14 and display 13. The system 30 includes a customer profile database 31. System 30 runs a number of processes of which:

processes 32, 33 and 34 are concerned with the maintenance of a current audience table 35 (stored in memory) that holds data on the interests of the current passers-by, and processes 36 and 37 are concerned with content selection and display having regard to the interest data held in table 35.

More particularly, process 32 is responsible for receiving the initial messages send back by devices 20 in response to the periodic beacon signal sent by transceiver 14. A device 20 is arranged to only sends its message in response to the first detection of the beacon signal from transceiver 14 so that process 32 can expect that the receipt of a message indicates a new passer-by in zone 15 (of course, the messaging protocol between a device 20 and transceiver 14 is preferably such that a reliable message delivery service is provided whereby the device will resend its message if safe receipt is not acknowledged by transceiver 14). In response to receipt of such a message, the process 32 first checks that a corresponding entry does not already exist in table 35 for the same user ID as contained in the message, and then causes a new table entry to be created in table 35 for the newly-detected passer-by. This entry includes the user ID, the time of entry creation ("joining time"), and any interest indicators contained in the corresponding message. Process 32 also passers the user ID of the message to a process 33 that uses it to check customer database 31 to ascertain whether the passer-by is an existing customer of shop 11; if so, process 33 extracts the customer's spend rating and any recorded interests and inserts them in the corresponding table entry. Spend rating is an indication of whether the customer is a high spender with the shop.

Since passers-by will only remain in presence zone 15 for a limited period, and since the audience table 35 is intended to keep track only of those passers-by currently capable of viewing the display 13, the table 15 needs to be kept up-to-date by the removal of entries that relate to passers-by that have moved on. This task is the responsibility of process 34 that continuously scans the "joining time"values in the table 35 and upon an entry having a value for this time that is, for example, 20 seconds earlier than the current time, process 34 causes transceiver 14 to send a presence-check message to the corresponding device. If a satisfactory acknowledgement message (distinguishable from the initial message) is received back, then process 34 simply updates the joining time for the entry concerned to correspond to the current time.

Process 36 is responsible for selecting the content for each successive display slot; each display slot is, for example, of ten seconds duration so that the process 36 operates on a 10 second cycle time. During each cycle, process 36 examines table 35 and on the basis of a predetermined set of selection criteria 50, selects the content to be displayed on display 13 in the next display slot. The content selection is made from amongst a content library 51 that comprises a set of specific promotions and an electronic store catalogue—the specific promotions are primarily intended to catch the attention of passers-by that indicate a general interest area matching a promotion whereas the electronic catalogue is intended to provide a source of content for matching more specific interests of passers-by.

The selection criteria can, for example, comprise the following criteria in order of precedence:
the interests of the detected person with a highest spend rating as recorded in a customer profile database provided this rating is at least a threshold minimum rating;
the most specific indicated interest relevant to a set of goods and/or services covered by content available for display;
the best fit of indicated interests to a set of promotional offers covered by content available for display;
the most common indicated interest of the detected persons. Other criteria, and combinations of criteria, are of course possible.

Process 37 is responsible for controlling the presentation on display 13 of the content selected by process 36 for each successive display time slot (see arrow 38). Where the content being displayed is a good match with the indicated interests of a passer-by, then process 36 indicates this to process 37 and the latter is responsible for sending an alert message (see arrow 39) via transceiver 14 to the mobile device 20 carried by the passer-by concerned. Process 37 may also send the displayed content (or a resume of the content) to the passer-by along with the alert.

Many variants to the above-described embodiment of the invention are, of course, possible. Thus, for example, the proximity of passers-by could be detected using location discovery technology rather than relying on the ability to communicate with a short-range device; more particularly, where passers-by carry cellular mobile radio devices communicating with a cellular radio infrastructure equipped with location-determining means, the proximity of passers-by could be effected by using the location-determining means of the cellular radio infrastructure to detect when passers-by are in the presence zone (assuming that the latter have consented to the use of data about their location in this manner).

Since passers-by moving away from the display (though still in the presence zone) are less likely to have their attention caught by the display 13, these passers-by and their interests can usefully be ignored. To do this requires that the transceiver 14 either alone or in combination with a second transceiver, are capable of detecting when a user is moving towards and/or away from the display 13—one possible way of doing this is simply to require that each device sends a succession of short messages to the transceiver with the gap between each message send being constant and for the transceiver then to ascertain whether the interval between message receipts is increasing or decreasing (this, of course, assumes that the transceiver aerial location is close to the display so that movement towards/away from the aerial corresponds to movement towards/away from the display). Where a passer-by is detected as moving away, their entry in table 35 is removed.

With regard to the alert, where a passer-by is detected as moving in a particular direction past the shop, the alert can indicate whether the passer-by needs to look to the left or to the right to view the display. In this case, the alert could be an audio prompt or the activation of a vibrator on the appropriate one of the left-hand and right-hand sides of the user (for example, the passer-by could have vibrators in the heel of each shoe, these vibrators being linked by a Bluetooth link to the user's device 20 for appropriate activation). As regards how the direction of passing of the passer-by is detected, this could be done with two spaced transceivers 14 (or transceivers with shaped beams) whereby a passer-by coming from one direction will be detected first by one of the transceivers whilst a passer-by coming from the opposite direction will be detected first by the other transceiver.

Whilst in the illustrated embodiment the passers-by are moving past a shop, it will be appreciated that they could be moving past any type of premises or even just past a free-standing advertising display. Alternatively, the passers-by could be inside a building such as a large department store, the display being associated with a particular department in the store.

The zone in which the display 13 is viewable need not be the same zone as the presence zone 15 in which the presence of passers-by is detected. The display zone, could, for example, be downstream of the presence zone with respect to the flow of passers-by (provided that a substantial proportion of the passers-by detected in the presence zone are likely also to enter the display zone). For example, persons on an escalator could be detected as they pass the halfway point, a display at the top/bottom of the escalator being subsequently changed to show content of interest to the persons alighting from the escalator. A similar arrangement could be used with an elevator with the presence zone being the elevator itself. Again, the separation of presence zone and display zone can usefully be applied to an advertising display intended for motorists with the presence zone being upstream of the display zone in the sense of traffic flow.

Further examples include having a presence zone at a fixed location such as a busy street corner and the display zone on the side of a passing bus or other vehicle (in such cases, appropriate communication means would be needed between the fixed and moving parts of the system—typically all the elements of system 30 would be implemented in a fixed installation except for content library and the parts of the process 37 concerned with controlling the display, these parts being instructed over a wireless link as to what content should next be displayed). Alternatively, the presence zone could be at a bus stop and the display could be inside the bus- in this case, the displayed content would be adjusted to take account of the interests of the latest passengers.

The examples given in the foregoing paragraph relate to persons that belong to less dynamically changing groups than the passers-by transiting the presence zone 15 of FIG. 1. Where the composition of a group remains static for a substantial period, then the processes for detecting group members can be simplified and can, for example, simply note joiners to a particular group rather than having to add and remove persons on an on-going basis. Examples of application of the embodiments of the invention to such static groups include the following situations:

- the display is located at a transportation terminal, the presence zone being located in a transport vehicle (including a train) or craft (including an aircraft) destined for the transportation terminal—in this case, the display would display relevant content for the arriving passengers, the display being informed by the transportation vehicle or craft as to what content was appropriate;
- the display is located in a transport vehicle or craft, the presence zone being located at a transportation terminal from where the transport vehicle or craft is to leave—in this case, the terminal informs the transport vehicle or craft as to what content is appropriate;
- the display is a cinema or stadium screen, the presence zone being inside the cinema or stadium (for example, in the entry areas).

What is claimed is:

1. A method of targeted content display, comprising the steps of:
    (a) detecting the presence of persons passing through a presence zone on the basis of transmissions made from mobile communication devices carried by such persons;
    (b) using information in said transmissions to ascertain interest indicators associated with the detected persons;
    (c) selecting content for display having regard to interest indicators found in step (b); and
    (d) displaying the selected content on a display;
performing steps (a) to (d) on an on-going basis with the displayed content being updated from time to time, the selection of content for display at each update being based on the interest indicators of the most recently detected persons without restriction to there only being a single such person whereby when multiple persons have been recently detected, content selection is based on the interest indicators of more than one person.

2. A method according to claim 1, wherein step (b) further includes determining whether a said most recently detected person has associated interest indicators that are a good match to the content being supplied, and in response to such a match being found, sending an alert to the mobile communication device of that person.

3. A method according to claim 2, wherein said alert indicates whether the person being alerted should look to the left or right to view the display.

4. A method according to claim 1, wherein step (b) includes receiving interest indicators from said detected persons via said mobile communication devices.

5. A method according to claim 1, wherein step (b) includes receiving identity information directly or indirectly originating from said mobile communication devices and using this identity information to look up interest indicators in a database.

6. A method according to claim 1, wherein selection of content for display at an update is effected using the interest indicators of multiple persons that have recently been detected as nearby, this selection being effected in dependence on any one or more of the following criteria:

- the most common indicated interest of said multiple persons;
- the best fit of indicated interests of said multiple persons to a set of promotional offers covered by content available for display;
- the most specific indicated interest of said multiple persons relevant to a set of goods and/or services covered by content available for display;
- the interests of the person from said multiple persons with a highest spend rating as recorded in a customer profile database.

7. A method according to claim 1, further including detecting that the detected persons are moving towards the display, priority being given in step (c) to the indicated interests of such persons.

8. A method according to claim 1, wherein the display is located in a shop window, the presence zone being a zone located in front of the shop.

9. A method according to claim 1, wherein the presence zone and display are both located in the interior of a shop.

10. A method according to claim 1, wherein the display is located at a roadside and the presence zone is situated upstream, in the sense of traffic flow past the display.

11. A method according to claim 1, wherein the presence zone is at a fixed location and the display is located on or in a vehicle.

12. A method according to claim 1, wherein the display is located in a display zone which is spaced from the presence zone but through which at least a substantial proportion of the persons passing through the presence zone will subsequently pass.

13. A method according to claim 1, wherein in step (a) the mobile communication devices are short-range wireless devices, step (a) including picking up transmissions from devices in the presence zone using a short-range wireless receiver located in or near the presence zone.

14. A method according to claim 1, wherein in step (a) the mobile communication devices include cellular mobile radio devices communicating with a cellular radio infrastructure equipped with a location-determining sub-system, step (a) including using the location-determining sub-system of the cellular radio infrastructure to detect persons in the presence zone.

15. A display system comprising:
    a detection arrangement for detecting the presence of persons passing through a presence zone on the basis of transmissions made from mobile communication devices carried by such persons;
    an interest-determination sub-system for using information in said transmissions to ascertain interest indicators associated with the detected persons;
    a content selector for selecting content for display having regard to the interest indicators obtained by the interest-determination sub-system; and
    an output arrangement comprising a display for displaying the content selected by the content selector, the display being separate from said mobile communication devices;
the display being arranged to operate on an on-going basis with the displayed content being updated from time to time, the content selector being operative to select content for display at each update in dependence on the interest indicators obtained by the interest-determination sub-system for the most recently detected persons without restriction to there only being a single such person whereby when multiple persons have been recently detected, content selection is based on the interest indicators of more than one person.

16. A display system according to claim 15, wherein the output arrangement further comprises an alert generator for determining whether a said most recently detected person has associated interest indicators that are a good match to the content being displayed, and where such a match is found, for sending an alert to the mobile communication device of that person.

17. A display system according to claim 16, wherein said alert indicates whether the person being alerted should look to the left or right to view the display.

18. A display system according to claim 15, wherein the interest-determination sub-system is operative to receive interest indicators from said detected persons via said mobile communication devices.

19. A display system according to claim 15, wherein the interest-determination sub-system is operative to receive identity information directly or indirectly originating from said mobile communication devices and to use this identity information to look up interest indicators in a database.

20. A display system according to claim 15, wherein the content selector is operative to select content for display at an update using the interest indicators of multiple persons that have recently been detected as nearby, this selection being effected in dependence on any one or more of the following criteria:

the most common indicated interest of said multiple persons;

the best fit of indicated interests of said multiple persons to a set of promotional offers covered by content available for stimulation;

the most specific indicated interest of said multiple persons relevant to a set of goods and/or services covered by content available for stimulation;

the interests of the person from said multiple persons with a highest spend rating as recorded in a customer profile database.

21. A display system according to claim 15, further comprising an arrangement for determining whether the detected persons are moving towards the display, priority being given by the content selector, when selecting content for display, to the indicated interests of such persons.

22. A display system according to claim 15, wherein the display is located in a shop window, the presence zone being a zone located in front of the shop.

23. A display system according to claim 15, wherein both the display and the presence zone associated with the detection arrangement, are located in the interior of a shop.

24. A display system according to claim 15, wherein the display is located at a roadside and the presence zone associated with the detection arrangement is situated upstream, in the sense of traffic flow past the display.

25. A display system according to claim 15, wherein the presence zone associated with the detection arrangement is at a fixed location and the display is located on or in a vehicle.

26. A display system according to claim 15, wherein the display is located in a display zone which is spaced from the presence zone but through which at least a substantial proportion of the persons passing through the presence zone will subsequently pass.

27. A display system according to claim 15, wherein the detection arrangement is arranged to receive transmissions from short-range wireless devices that constitute the said mobile communication devices.

28. A display system according to claim 15, wherein the detection arrangement is arranged to receive information about persons in the presence zone from a location-determining sub-system of a cellular radio infrastructure, the said mobile communication devices being cellular mobile radio devices.

29. A method of targeted stimulation, comprising the steps of:

(a) detecting the presence of creatures passing through a presence zone on the basis of transmissions made from mobile communication devices carried by such creatures;

(b) using information in said transmissions to ascertain interest indicators associated with the detected creatures;

(c) selecting content having regard to interest indicators found in step (b); and (d) supplying the selected content to a sensory stimulator separate from said mobile communication devices;

steps (a) to (d) being carried out on an on-going basis with the content being updated from time to time, the selection of content for stimulation at each update being based on the interest indicators of the most recently detected creatures without restriction to there only being a single such person whereby in response to recent detection of multiple creatures, content selection is based on the interest indicators of more than one creature.

30. A system comprising:

a detection arrangement for detecting the presence of creatures passing through a presence zone on the basis of transmissions made from mobile communication devices carried by such creatures;

an interest-determination sub-system for using information in said transmissions to ascertain interest indicators associated with the detected creatures;

a content selector for selecting content for stimulation of the creatures having regard to the interest indicators obtained by the interest-determination sub-system; and an output arrangement comprising a stimulator for stimulating the content selected by the content selector, the stimulator being separate from said mobile communication devices;

the system being arranged to operate on an on-going basis with the stimulated content being updated from time to time, the content selector being operative to select content to be supplied to the stimulator at each update in dependence on the interest indicators obtained by the interest-determination sub-system for the most recently detected creatures without restriction to there only being a single such creature whereby when multiple creatures have been recently detected, content selection is based on the interest indicators of more than one creature.

* * * * *